(12) United States Patent
Saiki et al.

(10) Patent No.: US 8,491,862 B2
(45) Date of Patent: Jul. 23, 2013

(54) APPARATUS AND METHOD FOR PRODUCING TRICHLOROSILANE

(75) Inventors: Wataru Saiki, Naka (JP); Taner Akbay, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 15 days.

(21) Appl. No.: 12/659,468

(22) Filed: Mar. 10, 2010

(65) Prior Publication Data

US 2010/0233062 A1 Sep. 16, 2010

(30) Foreign Application Priority Data

Mar. 11, 2009 (JP) ................... 2009-057654

(51) Int. Cl.
*C01B 33/107* (2006.01)
(52) U.S. Cl.
USPC .......................................... 423/342; 423/341
(58) Field of Classification Search
USPC .................................................. 423/341, 342
See application file for complete search history.

(56) References Cited

U.S. PATENT DOCUMENTS

| | | | |
|---|---|---|---|
| 4,165,363 A | | 8/1979 | Weigert et al. |
| 4,691,758 A | * | 9/1987 | Palmer .......................... 164/461 |
| 5,063,040 A | | 11/1991 | Ruff |
| 5,906,799 A | | 5/1999 | Burgie et al. |
| 2008/0264206 A1 | * | 10/2008 | Rocha et al. ..................... 75/383 |
| 2009/0324477 A1 | * | 12/2009 | Mizushima et al. ........... 423/342 |

FOREIGN PATENT DOCUMENTS

| | | |
|---|---|---|
| CN | 1850599 A | 10/2006 |
| EP | 2 085 359 A1 | 8/2009 |
| JP | 57-38524 | 12/1973 |
| JP | 3781439 | 10/1994 |
| WO | WO-2008/056550 A1 | 5/2008 |
| WO | WO-2008/146741 A1 | 12/2008 |

OTHER PUBLICATIONS

European Search Report dated Jun. 17, 2010 and Annex to the European Search Report on European Patent Application No. EP 10 15 6111.6.
Office Action dated Jan. 24, 2013, issued for the Chinese patent application No. 201010136864.8 and English translation thereof.

* cited by examiner

*Primary Examiner* — Ngoc-Yen Nguyen
(74) *Attorney, Agent, or Firm* — Edwards Wildman Palmer LLP

(57) ABSTRACT

An apparatus and a method for producing trichlorosilane are provided, which effectively suppresses the reaction converting trichlorosilane to tetrachlorosilane and the formation of polymers, thereby achieving a high recovery ratio of trichlorosilane. The apparatus for producing trichlorosilane includes: a converter reactor for converting a raw material gas containing tetrachlorosilane and hydrogen into a reaction product gas; a cooler for cooling the reaction product gas fed from the converter reactor; and a plurality of provided in the cooler for spraying cooling liquids. Average droplet diameters of the cooling liquids sprayed from a plurality of the nozzles are different from each other, and a cooling liquids volume sprayed from each of the plurality of nozzles is able to be individually adjusted.

8 Claims, 2 Drawing Sheets

APPARATUS AND METHOD FOR PRODUCING TRICHLOROSILANE

BACKGROUND OF THE INVENTION

1. Field of the Invention

The present invention relates to an apparatus and a method for producing trichlorosilane, which converts tetrachlorosilane into trichlorosilane.

Priority is claimed on Japanese Patent Application No. 2009-057654, filed on Mar. 11, 2009, the content of which is incorporated herein by reference.

2. Description of Related Art

High-purity polycrystalline silicon (Si) is produced by the hydrogen reduction reaction (Equation (2)) and the thermal decomposition reaction (Equation (3)) of highly purified trichlorosilane ($SiHCl_3$), which is produced by the conversion reaction (Equation (1)) of tetrachlorosilane ($SiCl_4$) with hydrogen.

$$SiCl_4 + H_2 \rightarrow SiHCl_3 + HCl \quad (1)$$

$$SiHCl_3 + H_2 \rightarrow Si + 3HCl \quad (2)$$

$$4SiHCl_3 \rightarrow Si + 3SiCl_4 + 2H_2 \quad (3)$$

As an apparatus for producing trichlorosilane using the reaction represented by Equation (1), for example, a conversion reaction apparatus, which is described in Japanese Patent No. 3781439, has been disclosed. Trichlorosilane is recovered from the reaction product gas produced in a reaction chamber (converter reactor) in the conversion reaction apparatus. The reaction chamber (converter reactor) surrounded by a heating element has a double chamber structure made of an outer chamber and an inner chamber configured by two tubes concentrically arranged. A raw material feeding tube line, which supplies hydrogen and tetrachlorosilane to the reaction chamber, and a discharge tube line, through which the reaction product gas is discharged from the reaction chamber, are connected to the reaction chamber via a heat exchanger below. In the heat exchanger, heat is exchanged between the reaction product gas discharged from the reaction chamber and the raw material gas fed to the reaction chamber. As a result, the raw material gas is pre-heated and the reaction product gas is cooled.

In Japanese Examined Patent Application Publication No. S57-38524, a method, in which tetrachlorosilane and hydrogen are introduced to a reaction chamber and are subjected to the conversion reaction at a temperature of 600 to 1,200° C. to obtain a reaction product gas containing trichlorosilane and hydrogen chloride, and the reaction product gas discharged from the reaction chamber is rapidly cooled at a cooling rate such that 300° C. or less can be reached within 1 second, was disclosed.

In an apparatus for producing trichlorosilane disclosed in Japanese Patent No. 3781439, a reaction product gas is cooled by heat exchange with a raw material gas in a heat exchanger on a lower portion of a reaction chamber. When the cooling rate is too low, during a process of cooling the reaction product gas, Equation 4, which is the reverse reaction of Equation (1), occurs, and the conversion ratio to trichlorosilane is decreased.

Japanese Examined Patent Application Publication No. S57-38524 disclosed a solution for the problem. The reaction of Equation (4) was suppressed by rapidly cooling the reaction product gas to a temperature range of equal to or less than 300° C. in less than 1 second. However, when a cooling rate, at which the reaction product gas is cooled, is too fast, dichlorosilylene ($SiCl_2$) contained in the reaction product gas reacts with tetrachlorosilane to produce polymers as byproducts (Equation (5)). Generation of the polymers reduces the conversion ratio to trichlorosilane and causes clogging of tubes due to deposition of the polymers inside tubes.

$$SiHCl_3 HCl \rightarrow SiCl_4 + H_2 \quad (4)$$

$$SiCl_2 + SiCl_4 \rightarrow Si_2Cl_6 \quad (5)$$

During the conversion reaction, a large amount of dichlorosilylene is produced at a high temperature (particularly at a temperature above 1200° C.) and discharged from the converter reactor with the reaction product gas. The polymers mentioned here collectively refer to high-order chlorosilanes with two or more silicon atoms, such as, hexachlorodisilane ($Si_2Cl_6$), octachlorotrisilane ($Si_3Cl_8$), or tetrachlorodisilane ($Si_2H_2Cl_4$).

As described above, when the reaction product gas is rapidly cooled for an extremely short time, the reaction converting trichlorosilane to tetrachlorosilane (Equation (4)) during cooling is suppressed, so that a recovery ratio of trichlorosilane is increased. On the other hand, when a temperature after cooling is too low, polymer production is increased (Equation (5)), and consequently the problematic polymer deposition occurs in the tubes after the cooling process. When the cooling rate is too slow, the recovery ratio of trichlorosilane is reduced since the reaction converting trichlorosilane to tetrachlorosilane proceeds faster, even though the polymer production can be suppressed easier by maintaining a proper temperature after cooling.

Therefore, the reaction product gas discharged from the converter reactor has to be cooled at a properly regulated rate, especially in a high temperature range of greater than or equal to 600° C., in which trichlorosilane is likely to decompose. However, the temperature of the reaction product gas discharged from the converter reactor is extremely high (greater than or equal to 1000° C.), and therefore it is difficult to perform rapid cooling at a properly regulated rate in the temperature range of greater equal to or higher than 600° C. Under these circumstances, conventionally, increasing the recovery ratio of trichlorosilane has been given priority, cooling the reaction product gas at an excessive cooling rate. As a result, the formation of the polymers has been a problem in the trichlorosilane production process.

SUMMARY OF THE INVENTION

The present invention was contrived in view of the above situation, and an object of which is to provide an apparatus and a method for producing trichlorosilane, which effectively suppresses the reaction converting trichlorosilane to tetrachlorosilane and the formation of polymers in a process of cooling a gas produced in a conversion reaction, thereby achieving a high recovery ratio of trichlorosilane.

An apparatus for producing trichlorosilane of the present invention is an apparatus for producing trichlorosilane including: a converter reactor for converting a raw material gas containing tetrachlorosilane and hydrogen into a reaction product gas; a cooler for cooling the reaction product gas fed from the converter reactor; and a plurality of nozzles provided in the cooler for spraying cooling liquids, wherein the plurality of nozzles are configured to spray droplets of the cooling liquids having at least two different average droplet diameters, and a cooling liquids volume sprayed from each of the plurality of nozzles is able to be independently adjusted.

In the producing apparatus, it is possible to effectively cool the high-temperature reaction product gas by spraying the cooling liquid having a large average droplet diameter, and it is possible to rapidly cool the reaction product gas by spraying the cooling liquid having a small average droplet diameter. Therefore, by properly adjusting the volume of each of the cooling liquid having different average droplet diameters and the total volume of a cooling liquids sprayed from the plurality of nozzles, it is possible to cool the reaction product gas at a proper cooling rate.

In the producing apparatus, a temperature sensor for measuring a temperature of the reaction product, and a controller for individually controlling the cooling liquids volume sprayed from the nozzles may further be included. By adjusting the cooling liquids volume sprayed from each nozzle according to the measurement result of the temperature sensor, it is possible to control the total amount of the cooling liquids sprayed inside the cooler and a ratio between the cooling liquids having a large average droplet diameter and a small average droplet diameter. Accordingly, it is possible to properly control the cooling rate of the reaction product gas, the temperature of the reaction product recovered from the cooler, and the like.

In the producing apparatus, a composition analyzer for analyzing a composition of the reaction product, and a controller for individually controlling the cooling liquids volume sprayed from the nozzles may further be included. In this case, by adjusting the cooling liquids volume sprayed from each nozzle according to the composition analysis result, it is possible to control the total amount of the cooling liquids sprayed inside the cooler and the ratio between the cooling liquids having a large average droplet diameter and a small average droplet diameter. Accordingly, it is possible to properly control the cooling rate of the reaction product gas, the temperature of the reaction product recovered from the cooler and the like.

In the producing apparatus, a temperature sensor for measuring a temperature of the reaction product, a composition analyzer for analyzing a composition of the reaction product, and a controller for individually controlling the cooling liquids volume sprayed from each of the nozzles may further be included.

A method for producing trichlorosilane of the present invention is a method for producing trichlorosilane including: converting a raw material gas containing tetrachlorosilane and hydrogen into a reaction product gas; and cooling the reaction product gas for recovering a reaction product containing trichlorosilane, wherein during cooling, the reaction product gas may be cooled in a cooler having a plurality of nozzles configured to spray droplets of cooling liquids having at least two different average droplet diameter, and a cooling rate of the reaction product gas may be adjusted by spraying cooling liquids from two or more nozzles having different average droplet diameters while adjusting the cooling liquids volume sprayed from each of the nozzles.

In the producing method, it is possible to effectively cool the high-temperature reaction product gas by spraying the cooling liquid having a large average droplet diameter, and it is possible to rapidly cool the reaction product gas by spraying the cooling liquid having a small average droplet diameter. Therefore, by spraying the cooling liquids while adjusting cooling liquids volume of each droplet or the total volume of cooling liquids, it is possible to cool the reaction product gas at a proper cooling rate.

In addition, during cooling, a temperature of the reaction product may be measured, and the volume of the cooling liquids may each be adjusted depending on the temperature. In this case, temperature of the reaction product gas can be cooled reliably down to 600° C. or less, at which trichlorosilane is less likely to convert into tetrachlorosilane.

In the producing method, a composition of the reaction product obtained by cooling may be analyzed, and the volume of the cooling liquids may each be adjusted based on the analysis result. In this case, it is possible to suitably control the volume of each of the cooling liquids according to the composition.

In the producing method, during cooling, a temperature of the reaction product may be measured, a composition of the reaction product obtained by cooling may be analyzed, and the volume of the cooling liquids may be adjusted depending on the temperature and the composition of the reaction product.

In the apparatus and method for producing trichlorosilane according to the present invention, it is possible to adjust the cooling rate of the reaction product gas and the temperature of the reaction product after cooling by spraying the cooling liquids having different average droplet diameters while controlling the volume of each of the cooling liquids. Therefore, it is possible to cool the reaction product while suppressing the formation of polymers and the reaction converting trichlorosilane to tetrachlorosilane, thereby effectively producing trichlorosilane.

DETAILED DESCRIPTION OF THE INVENTION

Figure 1:
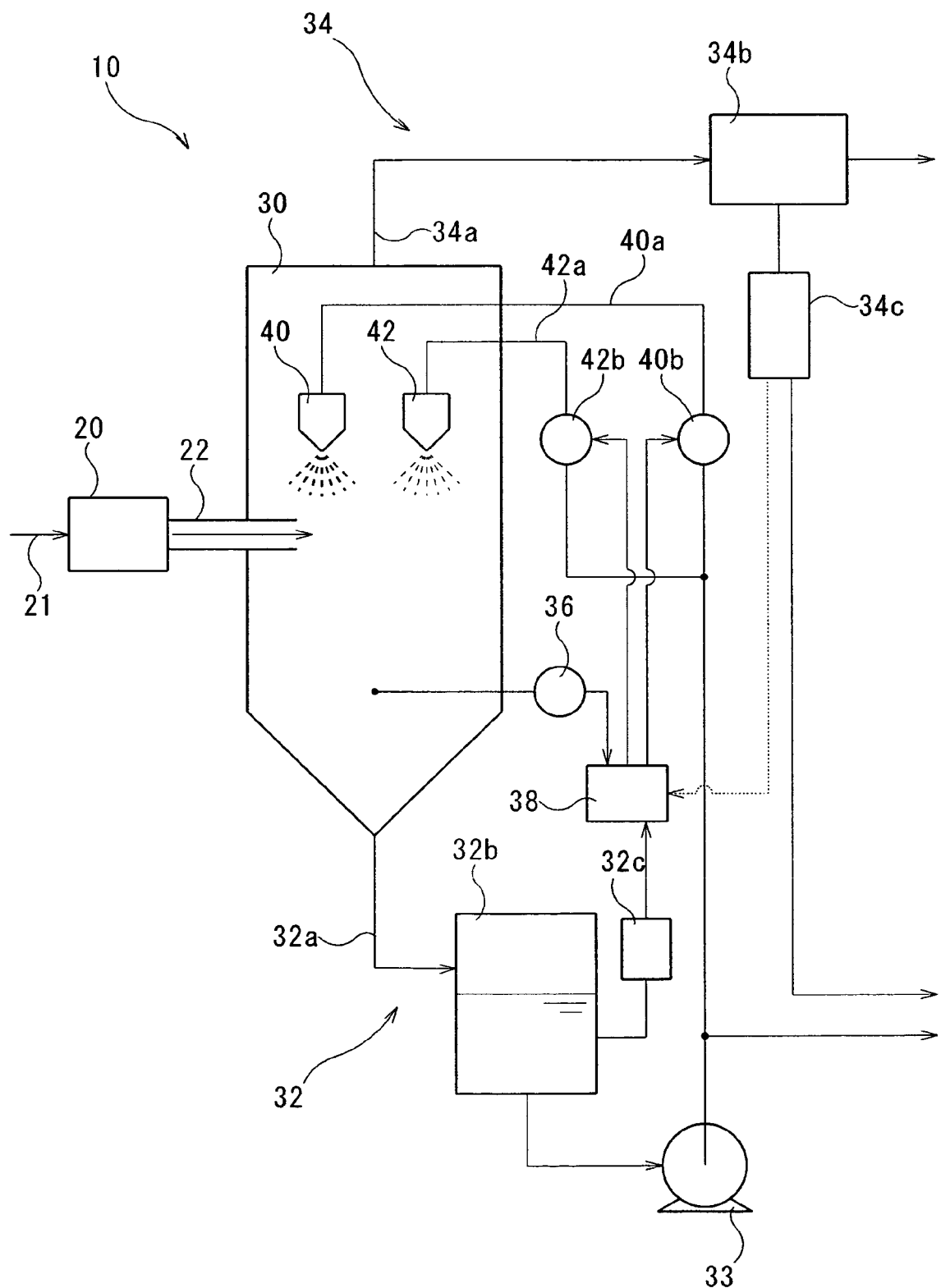
FIG. 1 is a diagram schematically illustrating an apparatus for producing trichlorosilane according to an embodiment of the present invention.

Hereinafter, an apparatus and a method for producing trichlorosilane according to an embodiment of the present invention will be described. As illustrated in FIG. 1, the apparatus 10 for producing trichlorosilane according to the embodiment of the present invention includes a converter reactor 20 for converting a raw material gas containing tetrachlorosilane and hydrogen into a reaction product gas, and a cooler 30 for cooling the reaction product gas fed from the converter reactor 20 to recover reaction products including trichlorosilane. To the converter reactor 20, a raw material gas feeding tube 21 for feeding the raw material gas to the converter reactor 20 and a reaction product gas feeding tube 22 for feeding the reaction product gas generated in the converter reactor 20 to the cooler 30 are connected. In the converter reactor 20, the raw material gas fed through the raw material gas feeding tube 21 is heated. By the heating, tetrachlorosilane (STC) is converted into the reaction product gas containing trichlorosilane (TCS) (a conversion process). The reaction product gas is fed to the cooler 30 through the reaction product gas feeding tube 22.

In the cooler 30, the reaction product gas fed through the reaction product gas feeding tube 22 is cooled (a cooling process), in order to recover the reaction products including trichlorosilane. In the cooler 30, a liquid recovery unit 32 for recovering liquid inside, a gas recovery unit 34 for recovering gas inside, a temperature sensor 36 for measuring an inside temperature, and first and second nozzles 40 and 42 for spraying cooling liquid inside are provided.

The liquid recovery unit 32 is a device including a connection tube 32a connected to a lower portion of the cooler 30 and a tank 32b connected to the connection tube 32a to recover liquid in the cooler 30 and store the liquid in the tank 32b. The liquid stored in the tank 32b includes the reaction products (trichlorosilane and the like) and the cooling liquid from the cooler 30 and is transferred to a trichlorosilane distillation device (not shown) and first and second nozzles 40 and 42 by a pump 33, distributing the liquid in a controlled flow rate to each.

The tank 32b is provided with a first composition analyzer 32c for analyzing the composition of the recovered liquid. The first composition analyzer 32c measures amounts of polymers and trichlorosilane included in the reaction products by analyzing the composition of the liquid.

The gas recovery unit 34 is a device including a connection tube 34a connected to an upper portion of the cooler 30 and a condenser 34b connected to the connection tube 34a to condense the gas from the cooler 30 using the condenser 34b so as to be separated into a liquid part and a gas part and then recovered. The recovered gas includes the reaction products (trichlorosilane and the like) from the cooler 30. The liquefied part of the recovered gas condensed by the condenser 34b is transferred to a trichlorosilane distillation device, and the gas part thereof containing hydrogen and hydrogen chloride is transferred to a hydrogen chloride recovery device (not shown) and separated into hydrogen and hydrogen chloride so as to be individually used. In addition, the condenser 34b is provided with a second composition analyzer 34c for analyzing the composition of the condensed liquid. By analyzing the composition of the liquid using the second composition analyzer 34c, together with the value measured by the first composition analyzer 32c, an amount of trichlorosilane contained in the reaction products can be measured.

The temperature sensor 36 is provided below the first and second nozzles 40 and 42 in the cooler 30 and measures a temperature (temperature of the reaction products) in the cooler 30 in a state of being cooled by the cooling liquid.

The first and second nozzles 40 and 42 are provided on the upper portion of the cooler 30 to spray the cooling liquid fed through cooling liquid feeding tubes 40a and 42a downwards. The cooling liquid is a mixed liquid mainly containing tetrachlorosilane and trichlorosilane fed from the tank 32b by the pump 33. The cooling liquid feeding tubes 40a and 42a are respectively provided with flow rate adjusting devices 40b and 42b, and amounts of the cooling liquid sprayed through the nozzles 40 and 42 can be individually adjusted by operating the flow rate adjusting devices 40b and 42b. An average droplet diameter of the cooling liquid sprayed from the first nozzle 40 is in the range of 2.0 to 6.0 mm, and preferably 4.0 mm. An average droplet diameter of the cooling liquid sprayed from the second nozzle 42 is in the range of 0.3 to 2.0 mm, and preferably 1.0 mm. Therefore, average droplet diameters of the cooling liquid sprayed from the first and second nozzles 40 and 42, are different.

The cooling rate is adjusted depending on the average droplet diameter of the cooling liquid and a flow rate thereof. As the average droplet diameter is decreased, an area of the cooling liquid in contact with the gas is increased, so that the cooling rate is increased. In addition, as the flow rate of the cooling liquid is increased, the cooling rate is increased, and the temperature of the gas after cooling drops faster.

With regard to the first nozzle 40 at which the average droplet diameter is large, when the average droplet diameter is smaller than 2.0 mm, the cooling rate is too fast, and the time maintaining a range of 600 to 950° C. in which the formation of polymers is suppressed is too short, resulting in an increase in the amount of polymers. On the other hand, when the average droplet diameter is greater than 6.0 mm, the cooling rate is decreased, and the time maintaining a range of greater than or equal to 600° C. in which the reaction converting trichlorosilane to tetrachlorosilane is suppressed is too long, resulting in a decrease in yield of trichlorosilane. In addition, an amount of liquid needed to sufficiently decrease the temperature of the gas after cooling is increased, which is not efficient. Therefore, the average droplet diameter of the cooling liquids sprayed from the first nozzle 40 is set to be in the range of 2.0 to 6.0 mm.

With regard to the second nozzle 42 at which the average droplet diameter is small, when the average droplet diameter is smaller than 0.3 mm, although an effect of suppressing the reaction converting trichlorosilane to tetrachlorosilane by increasing the cooling rate for cooling down to the range of 600 to 950° C. from the conversion temperature is not changed, the work needed to finely distribute and feed the cooling solution is increased, making the process economically unfavorable. On the other hand, when the average droplet diameter is greater than 2.0 mm, the effect achieved by increasing the cooling rate for cooling down to the range of 600 to 950° C. from the conversion temperature is decreased, and the cooling rate is slowed down in this range. In this case, the reaction converting trichlorosilane to tetrachlorosilane cannot be sufficiently suppressed, and the yield of trichlorosilane is reduced. Therefore, the average droplet diameter of the cooling liquids sprayed from the second nozzle 42 is set to be in the range of 0.3 to 2.0 mm.

Further, in a case where a plurality of nozzles having different droplet diameters of the cooling liquids are provided, it is preferable that at least a nozzle having an average droplet diameter of the cooling liquids in the range of 2.0 to 6.0 mm and a nozzle having an average droplet diameter of the cooling liquids in the range of 0.3 to 2.0 mm be included. It is further preferable that the nozzles are the full cone spray nozzles that are capable of dispersing the small droplets evenly into wide range.

In addition, the apparatus 10 for producing trichlorosilane is provided with a controller 38 for individually controlling the a cooling liquids volume sprayed from the first and second nozzles 40 and 42 by operating the flow rate adjusting devices 40b and 42b based on the measurement and analysis results of the first composition analyzer 32c and the temperature sensor 36.

Trichlorosilane may be produced as follows using the apparatus 10 for producing trichlorosilane having the above-mentioned configuration.

Conversion Process

First, the raw material gas containing tetrachlorosilane and hydrogen is introduced to the converter reactor 20 through the raw material gas feeding tube 21. As the raw material gas is heated to 1,000 to 1,900° C. in the converter reactor 20, the conversion reaction (hydrogenation) of Equation (1) occurs, and the reaction product gas is produced.

$$SiCl_4 + H_2 \rightarrow SiHCl_3 + HCl \qquad (1)$$

The reaction product gas is input to the cooler 30 through the reaction product gas feeding tube 22.

Cooling Process

As the reaction product gas is cooled by the cooling liquid sprayed from the first and second nozzles 40 and 42 in the cooler 30, the reaction products are recovered. During cooling process, by adjusting the a cooling liquids volume sprayed from the first and second nozzles 40 and 42, the amount of polymers produced can be reduced, and the reaction product gas can be cooled at a cooling rate for suppressing the reaction converting trichlorosilane to tetrachlorosilane. Specifically, after the reaction product gas is cooled down to 600 to 950° C. for 0.01 to 1 second, the temperature of the reaction product gas is maintained in the range of 600 to 950° C. for 0.01 to 5 seconds, and then the cooling rate (that is, the volume of cooling liquids) is adjusted so that the reaction product gas is finally cooled to less than 600° C. This adjustment is made by the flow rate adjusting devices 40b and 42b, which are operated by the controller 38, so that the measurement result of the temperature sensor 36 is less than 600° C. while the formation of polymers is reduced and an amount of trichlorosilane is increased based on the analysis result of the first composition analyzer 32c.

The reaction products cooled and liquefied (mainly tetrachlorosilane and trichlorosilane) are recovered by the liquid recovery unit 32 along with the cooling liquid and stored in the tank 32b through the connection tube 32a. In addition, the gas in the cooler 30 is recovered by the gas recovery unit 34 and sent to the condenser 34b through the connection tube 34a. The gas mainly contains trichlorosilane, hydrogen chloride, and hydrogen, and in the condenser 34b, hydrogen chloride gas and hydrogen gas are recovered and condensed and liquefied trichlorosilane is recovered. Part of the trichlorosilane recovered by the liquid recovery unit 32 is sent to the first and second nozzles 40 and 42 as the cooling liquid, and the remaining part of the trichlorosilane is recovered along with the trichlorosilane recovered by the gas recovery unit 34.

The adjustment of the cooling rate during cooling process is based on the following consideration.

The reaction product gas at a high temperature can be effectively cooled by the cooling liquid that is sprayed from the first nozzle 40 in a state having a large average droplet diameter. In addition, the cooling liquid sprayed from the second nozzle 42 has a small average droplet diameter and a large specific surface area, so that the reaction product gas can be rapidly cooled. Therefore, by spraying the cooling liquids having different average droplet diameters in a mixed state, it is possible to obtain cooling effects due to small droplets and large droplets. Specifically, the reaction product gas can be cooled at cooling rates of two stages including a first stage with a high cooling rate and a second stage in which a cooling rate is low because the cooling effects are obtained due to large droplets after small droplets are vaporized. In addition, by properly adjusting the cooling liquids volume sprayed from each of the first and second nozzles 40 and 42 or the total volume cooling liquids sprayed from the nozzles, it is possible to set the cooling rate and the temperature to reach to the desired levels in each stage.

As described above, by performing the producing method according to the embodiment of the present invention using the apparatus 10 for producing trichlorosilane according to the embodiment of the present invention, the reaction product gas can be cooled to prevent the formation of polymers or the reaction converting trichlorosilane to tetrachlorosilane, and trichlorosilane can be effectively produced.

Here, Examples 1 to 4 and Comparative Examples 1 to 4 of the producing apparatus 10 according to the embodiment of the present invention are shown. By varying the average droplet diameter of the cooling liquid and the amount of the cooling liquid, differences between the reaction products in temperature and composition are compared.

In Examples 1 to 4, a producing apparatus for spraying cooling liquids from a nozzle having an average droplet diameter of 1.0 mm and a nozzle having an average droplet diameter of 4.0 mm was used, and the volume of the cooling liquids from the nozzles were respectively varied. In Comparative Examples 1 to 4, a producing apparatus for spraying a cooling liquid from a nozzle having an average droplet diameter of 2.5 mm was used, and the volume of the cooling liquid from the nozzle was respectively varied. Here, the above-mentioned average droplet diameter is the volume average diameter (volume median diameter) measured by a particle size distribution measurement device in a laser light scattering method or a phase Doppler method.

In Examples and Comparative Examples, a raw material that is a mixture of hydrogen ($H_2$) and tetrachlorosilane ($SiCl_4$) at a molar ratio $H_2/SiCl_4$ of 2 was used. The conversion temperature in the converter reactor was set to 1150° C. As the cooling liquid, so as not to affect the composition of the reaction product, a 100% tetrachlorosilane solution was used instead of a mixed liquid mainly containing tetrachlorosilane and trichlorosilane recovered from the reaction product.

Figure 2:
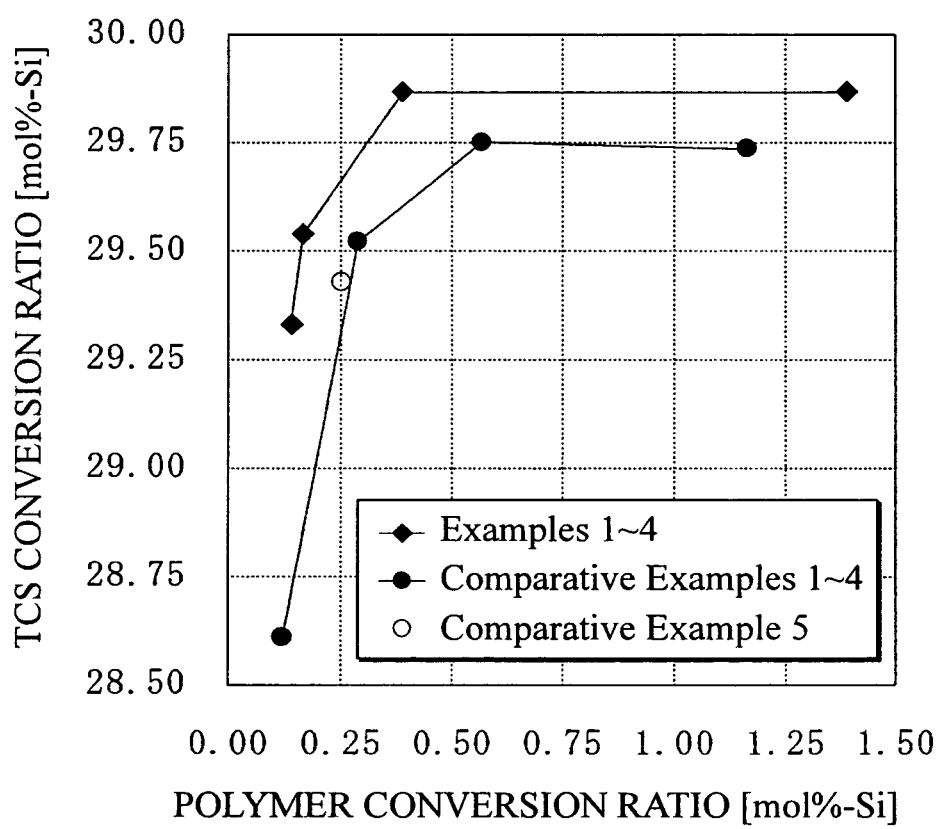
FIG. 2 is a graph showing each conversion ratio to polymer and trichlorosilane (TCS) in Examples and Comparative Examples related to the apparatus and the method for producing trichlorosilane according to the embodiment of the present invention.

The conversion ratio represents the amount of Si in the polymer or trichlorosilane (TCS) when the amount of Si in the raw material gas is regarded as being 100 mol (see FIG. 2). In the production of trichlorosilane, it is preferable that the conversion ratio to polymer is low (less than 0.2 [mol %-Si], meaning the amount of polymers produced is small) and the conversion ratio to TCS (trichlorosilane) is high (higher than 29 [mol %-Si], meaning the amount of TCS produced is great). The temperature after cooling is a temperature measured by the temperature sensor 36, and needs to be lower than or equal to 600° C. in the producing apparatus and the producing method.

Examples

As illustrated in Table 1, a ratio of the total volume of cooling liquids between droplets having different average droplet diameters was varied to perform a cooling process. As a result, in comparison of Examples 1, 2 and 4, using the same amount of cooling liquid, it was found that the temperature after cooling was decreased and the amounts of polymers and trichlorosilane were increased, when the ratio of the cooling liquid having a small average droplet diameter was increased. In addition, as a result, in comparison of Examples 2 and 3 using the same amount of cooling liquid having average droplet diameter of 1.0 mm, it was found that the temperature after cooling was increased and the amounts of polymers was kept less than 0.2 mol %-Si even though the amounts of trichlorosilane was kept more than 29 mol %-Si, when the amounts of cooling liquid having average droplet diameter of 4.0 mm was decreased (Example 3). Among Examples 1 to 4, Examples 3 and 4 show small amounts of polymers and large amounts of TCS, which is preferable.

TABLE 1

| | Ratio of Cooling Liquid to Raw Material by Weight | | | | |
|---|---|---|---|---|---|
| | Average Droplet Diameter | Average Droplet Diameter | Conversion Ratio [mol %-Si] | | Temperature after Cooling |
| Examples | 1.0 mm | 4.0 mm | Polymers | TCS | [° C.] |
| 1 | 2.0 | 2.0 | 1.39 | 29.87 | 445 |
| 2 | 1.4 | 2.6 | 0.39 | 29.87 | 505 |
| 3 | 1.4 | 1.2 | 0.17 | 29.54 | 566 |
| 4 | 1.0 | 3.0 | 0.14 | 29.34 | 555 |

Based on the result in Example 1, it could be interpreted that the reaction converting trichlorosilane to tetrachlorosilane was suppressed by an effect of rapid cooling, whereas a large amount of polymers was formed since the cooling rate was excessively increased during rapid cooling and the temperature after cooling became too low.

In comparison with Example 1, Example 2, in which the ratio of the cooling liquid having small droplets was set to be low and the same amount of cooling liquid was used, showed less formation of the polymers even with the equivalent level of TCS recovery to Example 1. This was interpreted that cooling rate was fast enough, but over cooling was avoided by the temperature control in Example 2.

In Example 3, the amount of the cooling liquid having small droplets was set to be the same as that in Example 2 and the amount of the cooling liquid having large droplets was reduced to be less than Example 2. Here, although the amount of TCS was slightly reduced, the amount of polymers was reduced less than half. This was interpreted that while the reaction converting trichlorosilane to tetrachlorosilane was suppressed by the rapid cooling effect due to the cooling liquid having small droplets, the temperature after cooling was increased due to the reduction in the amount of the cooling liquid having large droplets, reducing the formation of the polymers.

In Example 4, although the same amount of cooling liquid as that in Example 2 was used, the ratio of the cooling liquid having small droplets as compared with Example 2 was reduced. Consequently, the temperature after cooling was high as compared with Example 2, and although the amount of TCS was slightly reduced, the amount of polymers was reduced. This was interpreted that the amount of TCS was reduced because the rapid cooling effect due to the cooling liquid having small droplets is relatively weak, and the amount of the polymers was reduced because the temperature after cooling was high.

Comparative Examples

As shown in Table 2, the ratio of the cooling liquid to the raw material by weight varied from 4.0 to 7.0, and the cooling process was performed using only a nozzle having an average droplet diameter of 2.5 mm. As a result, it was found that the temperature after cooling was decreased as the amount of the cooling liquid was increased. In addition, it was found that amounts of polymers and TCS were decreased as the amount of the cooling liquid was increased and the temperature after cooling was reduced. In Comparative Examples 1 to 4, in consideration of the fact that the rapid cooling effect was obtained to some extent by increasing the amount of the cooling liquid, the amount of TCS was slightly increased. On the other hand, an increase in the amount of polymers produced was not suppressed due to the decrease in the temperature after cooling. Thus, it was interpreted that when the cooling process was performed using only a single nozzle, it is difficult to perform the cooling process at a proper cooling rate and a proper temperature after cooling.

TABLE 2

| Comparative Example | Ratio of Cooling Liquid to Raw Material by Weight Average Droplet Diameter | Conversion Ratio [mol %-Si] | | Temperature after Cooling |
|---|---|---|---|---|
| | 2.5 mm | Polymer | TCS | [° C.] |
| 1 | 4.0 | 0.12 | 28.61 | 553 |
| 2 | 5.2 | 0.29 | 29.52 | 476 |
| 3 | 6.0 | 0.57 | 29.75 | 436 |
| 4 | 7.0 | 1.16 | 29.74 | 393 |

In addition, as shown in Table 3, using the same two nozzles having an average droplet diameter of 2.5 mm, the cooling process was performed by setting a ratio of the cooling liquid sprayed from each nozzle to the raw material by weight to 2.5 (total 5.0) (Comparative Example 5). As a result, as in Comparative Example 2, it was interpreted that the rapid cooling effect could be obtained to some extent. However, an increase in the amount of polymers was also not suppressed. Thus, it was interpreted that even in a case where a plurality of nozzles is used for cooling, if the average droplet diameters of cooling liquids sprayed from the nozzles are the same, it is difficult to perform the cooling process at a proper cooling rate and a proper temperature after cooling.

TABLE 3

| Comparative Example | Ratio of Cooling Liquid to Raw Material by Weight | | Conversion Ratio [mol %-Si] | | Temperature after Cooling |
|---|---|---|---|---|---|
| | Average Droplet Diameter | Average Droplet Diameter | | | |
| | 2.5 mm | 2.5 mm | Polymers | TCS | [° C.] |
| 5 | 2.5 | 2.5 | 0.25 | 29.43 | 445 |

As described above, according to the embodiment of the present invention, in the apparatus 10 for producing trichlorosilane including the first and second nozzles 40 and 42 configured to spray droplets of cooling liquids having at least two different average droplet diameters, the cooling liquids volume sprayed from each of the nozzles is suitably adjusted, thereby adjusting the cooling rate of the reaction product gas in the cooler 30. Accordingly, the reaction converting trichlorosilane to tetrachlorosilane can be suppressed by rapid cooling the high-temperature reaction product gas, and the formation of polymers can be reduced by properly maintaining the temperature of the reaction product after cooling, thereby effectively producing trichlorosilane.

The present invention is not limited by the configurations described in the embodiments, and various modifications of the detailed configurations can be made without departing from the spirit and scope of the present invention.

For example, according to this embodiment, an apparatus for producing trichlorosilane having two nozzles spraying droplets of cooling liquids having different average droplet diameters is described. However, the number of nozzles and average droplet diameters thereof is not limited to 2 and may be 3 or more. In addition, the nozzles may be arranged in a vertical direction.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:
1. A method for producing trichlorosilane comprising:
providing a cooler with a chamber having at least first and second nozzles configured to spray droplets of cooling liquids having at least two different average droplet diameters in which a cooling rate of the reaction product gas is adjusted by adjusting independently the cooling liquids volume sprayed from each of the first and second nozzles;

converting a raw material gas containing tetrachlorosilane and hydrogen into a reaction product gas; and cooling the reaction product gas to a range of 600 to 950° C. for 0.01 to 1 second for producing a reaction product containing trichlorosilane, wherein during cooling, the reaction product gas is cooled in the cooler by spraying the cooling liquids having different average droplet diameters in a mixed state, the first nozzle sprays droplets having a first average droplet diameter between 2.0 mm and 6.0 mm, the second nozzle sprays droplets having a second average droplet diameter between 0.3 mm and 2.0 mm which is different from the first average droplet diameter, and the cooling liquid is a mixed liquid containing tetrachlorosilane and trichlorosilane.

2. The method according to claim 1,
wherein during cooling, a temperature of the reaction product is measured, and the volume of the cooling liquids is adjusted depending on the temperature.

3. The method according to claim 1,
wherein a composition of the reaction product obtained by cooling is analyzed, and the volume of the cooling liquids is adjusted on the basis of the composition.

4. The method according to claim 1,
wherein during cooling, temperature of the reaction product is measured, a composition of the reaction product obtained by cooling is analyzed, and the volume of the cooling liquids is adjusted depending on the temperature and the composition of the reaction product.

5. The method according to claim 1,
wherein after the reaction product gas is cooled down to 600 to 950° C., the temperature of the reaction product gas is maintained in the range of 600 to 950° C. for 0.01 to 5 seconds.

6. The method according to claim 1,
wherein the raw material gas is heated to 1,000 to 1,900° C. in the step of converting.

7. The method according to claim 6, wherein, in the step of cooling, the reaction product gas is cooled down to 600 to 950° C. for 0.01 to 1 second and is maintained in the range of 600to 950° C. for 0.01 to 5 seconds, and is finally cooled to less than 600° C., by adjusting independently the cooling liquids volume sprayed from each of the nozzles.

8. The method according to claim 1,
wherein the spray nozzles are full cone spray nozzles.

* * * * *